United States Patent
Paul, III

(10) Patent No.: US 6,997,176 B2
(45) Date of Patent: Feb. 14, 2006

(54) QUICK AND EASY CAMPFIRE

(76) Inventor: John Leo Paul, III, 1777 S. Mill Rd., Heber City, UT (US) 84032

( * ) Notice: Subject to any disclaimer, the term of this patent is extended or adjusted under 35 U.S.C. 154(b) by 0 days.

(21) Appl. No.: 10/605,942

(22) Filed: Nov. 7, 2003

(65) Prior Publication Data

US 2004/0107958 A1    Jun. 10, 2004

Related U.S. Application Data

(60) Provisional application No. 60/425,788, filed on Nov. 12, 2002.

(51) Int. Cl.
*F24C 3/08* (2006.01)

(52) U.S. Cl. ............. 126/512; 126/519; 126/9 R; 126/40

(58) Field of Classification Search ........ 126/512, 126/519, 304 R, 304 A, 59, 9 R, 38, 39 K, 126/39 R, 40; 431/310
See application file for complete search history.

(56) References Cited

U.S. PATENT DOCUMENTS

| | | | |
|---|---|---|---|
| 1,496,344 A * | 6/1924 | Levinson | 126/38 |
| 3,493,314 A * | 2/1970 | Krance et al. | 431/291 |
| 3,866,994 A * | 2/1975 | Bonin | 126/25 R |
| 4,621,608 A * | 11/1986 | Lee | 126/9 R |
| 5,901,697 A * | 5/1999 | Oliver et al. | 126/92 AC |
| 6,006,743 A * | 12/1999 | Shimek et al. | 126/512 |
| 6,173,709 B1 * | 1/2001 | Yokoyama | 126/40 |
| 6,192,881 B1 * | 2/2001 | Nix | 126/512 |
| 6,227,843 B1 * | 5/2001 | Pedersen et al. | 431/125 |
| 6,289,887 B1 * | 9/2001 | Oliver et al. | 126/41 R |

FOREIGN PATENT DOCUMENTS

GB      2 370 108 A    *  6/2002

* cited by examiner

*Primary Examiner*—Josiah C. Cocks
(74) *Attorney, Agent, or Firm*—Clayton, Howarth & Cannon, P.C.

(57) ABSTRACT

A quick and easy to use campfire, fueled by portable bottles of propane gas connected through a variable high-pressure regulator that is used to adjust the fireball size. The burner assembly is a round tube used as a manifold and bent in an annular shape using the size and location of the orifices to produce the shape, activity and texture of the campfire flame. The aluminum windscreen provides a base, with folding legs, that holds the burner, and provides a protective wind buffer for the flames. The windscreen also provides a reflective heat shield for the resting surface located under the legs, and is used to dissipate the internal heat for quick cooling.

7 Claims, 5 Drawing Sheets

QUICK AND EASY CAMPFIRE

BACKGROUND OF INVENTION

The present disclosure relates to the field of portable campfires. More particularly, the present disclosure relates to portable campfires that utilize propane or natural gas for fuel, and do not use any logs, fillers, or water to defuse the gas. This invention is used to replace the ambiance, light, and heat of a traditional wood campfire.

The present invention uses a specially designed burner to produce a flame ball that has the color, look and flame action that will create the appearance of a wood campfire. This device is to be used as a substitute quick and easy no mess portable replacement for a wood fire, for heat, for light, for ambiance, and for cooking. The outdoor camping experience, for most people, is not complete without a fire. The fire is an integral part of space heating, lighting, and food preparation. There are many compressed gas alternatives to a wood fire for cooking, the problem is, that the flames are designed for maximum heat and are blue in color and smaller than a normal wood fire. There are a couple of alternatives for campfire replacement. For example U.S. Pat. Nos. 6,289,887, 6,227,843, 5,901,697 and 6,192,881, all use filler/buffer material and/or artificial logs and/or water to defuse the gas and shape the fireball. Since most users watch the fire and not the logs, the logs cause unnecessary problems. By using this invention's burner it is possible to achieve a "wood campfire" look without the defusing material. The defusing systems cause problems in portability (because of loose material, heat retention and carbon buildup) and are relatively large because of the artificial logs. There is a built in limit in available BTU's of heat because the artificial logs retain and concentrate the heat inside of the device and increase the cooling time needed before the device can be packed. The burners that are designed to be used in cooking are not effective in replacing the aesthetics of a wood fire, and the burners that replace the wood fire aesthetics are not efficient for cooking. With the State and Federal regulations that control and curtail the use of normal wood fires because of fire safety, in drought conditions and/or fire pit ash and litter around waterways and lakes, there is getting to be a large need for quick, safe, packable, no-trace, and ecologically sound fire replacement device. This invention is light (under 6 lbs), quickly cooling (packable in under 10 minutes), compact (legs fold for storage), and has no loose parts.

SUMMARY OF INVENTION

The primary object of the present invention is to provide a quick and easy to use campfire replacement device.

Another object of the present invention is to make a portable campfire that is simple to use.

Another object of the present invention is to make a portable campfire that is easy to manufacture.

Another object of the present invention is to make a portable campfire that cools quickly.

Another object of the present invention is to make a portable campfire that is small and light for easy transportation and set up.

Another object of the present invention is to make a portable campfire that produces heat.

Another object of the present invention is to make a portable campfire that produces light.

Another object of the present invention is to make a portable campfire that is usable in "leave no trace" camping situations.

Another object of the present invention is to make a portable campfire that is usable during fire restriction periods.

Many desirable aspects are inherent in using pressurized gas as a fuel source, such as, no sparks, and no smoke.

The present invention "quick and easy campfire," may be fueled by portable bottles of propane gas connected through a variable high-pressure regulator that is used to adjust the fireball size. The regulator is attached through a flexible hose to the burner assembly. The burner assembly consists of a galvanized pipe bent in a 12-inch circle with an input aperture connected to the flexible hose and a plug in the terminating end. The burner assembly must be adequately sized to reduce the gas velocity. There are varied hole sizes and hole patterns that modify the fireball shape and fire dancing activity, and therefore control the fire usage. Two fire patterns and uses are to be used interchangeably with the windscreen base. The last part of the device is a windscreen base, with folding, collapsible, legs, for (1) holding the burner, (2) providing a protective windscreen for the flames, and (3) providing a reflective heat shield for the resting surface located under the base. The first burner pattern has 13–⅛-inch holes in a set pattern that produces a yellow orange fireball with long dancing fire fingers to produce a fire similar to a normal wood campfire. The second burner has 29 1/16-inch holes in a set pattern that produces a brighter yellow flame that is uniform and steady, it produces a cleaner more uniform heat and light with less flicker.

With this invention the state of the art is improved by using a round tube as a manifold built to prevent any mixing of gas with air before ignition, and bent in a annular shape allowing the placement of orifices of different sizes and angles to construct and control making of the fireball.

With this invention the state of the art is improved by using aluminum that reflects and dissipates the heat and is bent in a shape that decreases the susceptibility to the effects of the wind.

With this invention the state of the art is improved by using a process that produces a compact, light, easy to manufacture portable campfire.

BRIEF DESCRIPTION OF DRAWINGS

The features and advantages of the disclosures will become apparent from a consideration of the subsequent detailed description presented in connection with the accompanying drawings which are part of the specification.

DETAILED DESCRIPTION

The quick and easy campfire of the present invention consists of a windscreen base, with folding, collapsible, legs, for (1) holding the burner, (2) providing a protective windscreen for the flames, and (3) providing a reflective heat shield for the resting surface located under the base. The scalloped wavy edges of the wind screen produce multiple vortices in a wind that protect the individual flames and increase the wind protection. The windscreen is made of aluminum to increase the heat dissipation, increase the corrosion resistance, reduce weight, and shorten the cooling time. The legs are permanently attached to the windscreen base. The legs interlock and fold to reduce the inventions size in transport and storage. The interchangeable burners may be set in the windscreen base, The burner assemblies consist of a galvanized pipe bent in a 12-inch circle with an input aperture connected to the flexible input hose and a plug in the terminating end. The preferred burner pattern has 13 each—⅛-inch holes in a set pattern that produces a yellow orange fireball with long dancing fire fingers to produce a fire similar to a normal wood campfire. The second burner has 29 ¹⁄₁₆-inch holes in a set pattern that produces a brighter yellow flame that is uniform and steady, it produces a cleaner more uniform heat and light with less flicker. The device is fueled by portable bottles of propane gas connected through a variable, high-pressure regulator that is used to adjust the fireball size. The regulator is attached through a flexible hose to the burner assembly. The interchangeable burners allow the device to be used to produce an aesthetically pleasing wood fire replacement flame or a steady heat source for cooking. The integral windscreen base with folding legs allow for maximum portability in folding into a compact 14 inch by 14 inch by 4 inch package for transportation and storage that weighs only 5 lbs. Because the functionality is in the aesthetics of the fireball and is not dependant on artificial logs or fillers to shape the fire, this allows the device to radiate more BTU's and reduces the internal heat of the device, which allows the device to cool quickly and to be packed within 10 minutes of usage.

The parts of the present invention are: Item 1) the flexible hose and a variable regulator, consisting of a high-pressure propane regulator varying from 0 to 10 PSI. The regulator comes with a standard hand tight POL or new style green connector (high capacity Type I) on the gas bottle end and a female ¼ inch NPT on the outlet end. The hose is a 6 foot synthetic high-pressure gas hose with a male ¼ inch normal pipe thread on one end and a ⅜ inch swivel on the other end. This item 1 is shown connected to the burner in FIGS. 1, 2, and 3.

Figure 1:
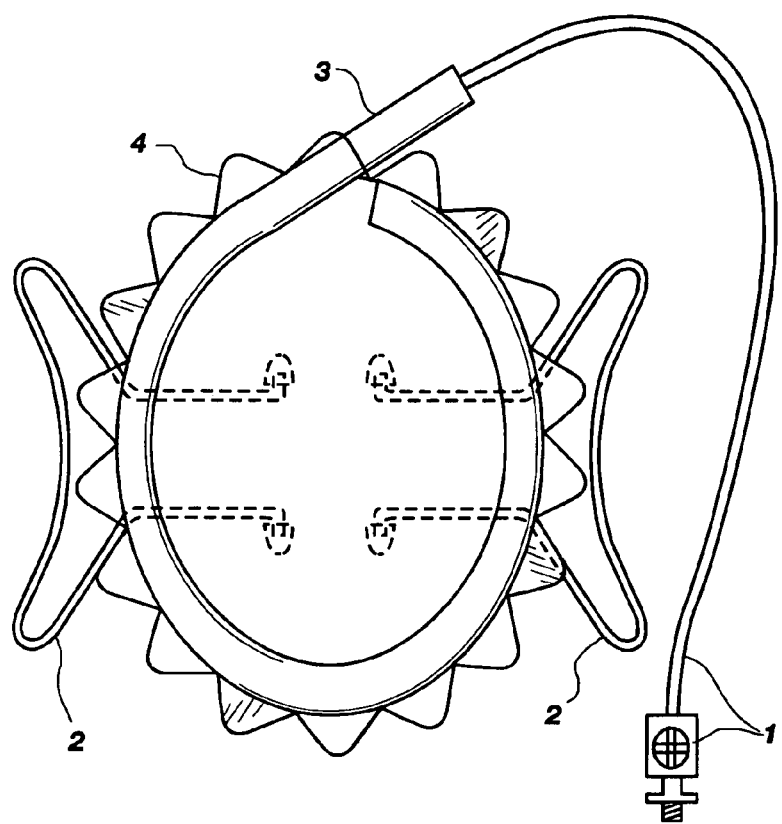
FIG. 1: is a top view of the present invention.
Figure 2:
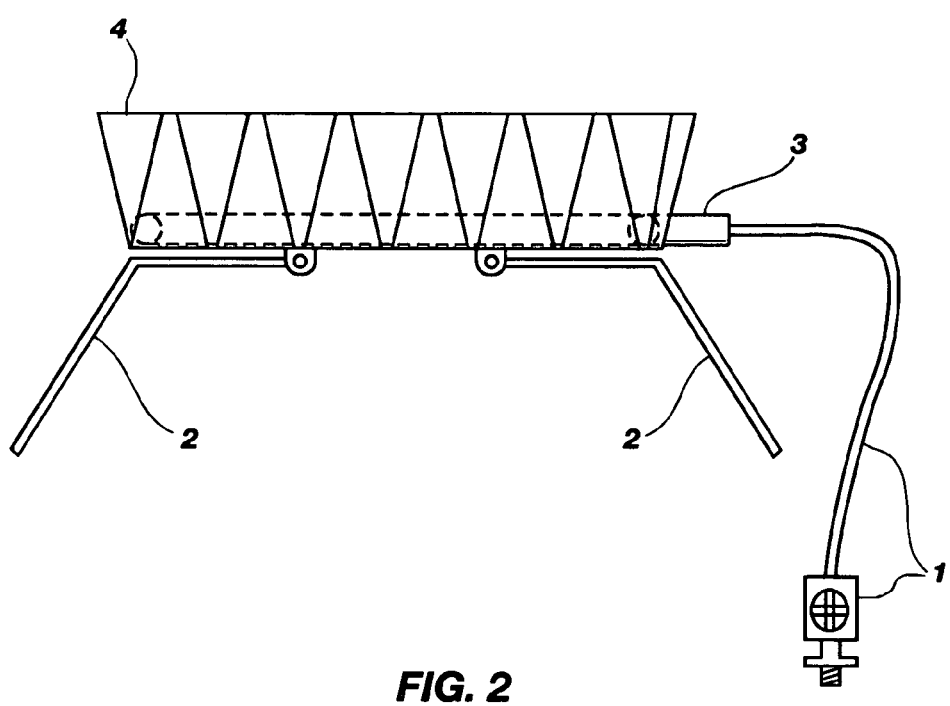
FIG. 2: is a side view of the present invention with the folding legs in an extended position.
Figure 3:
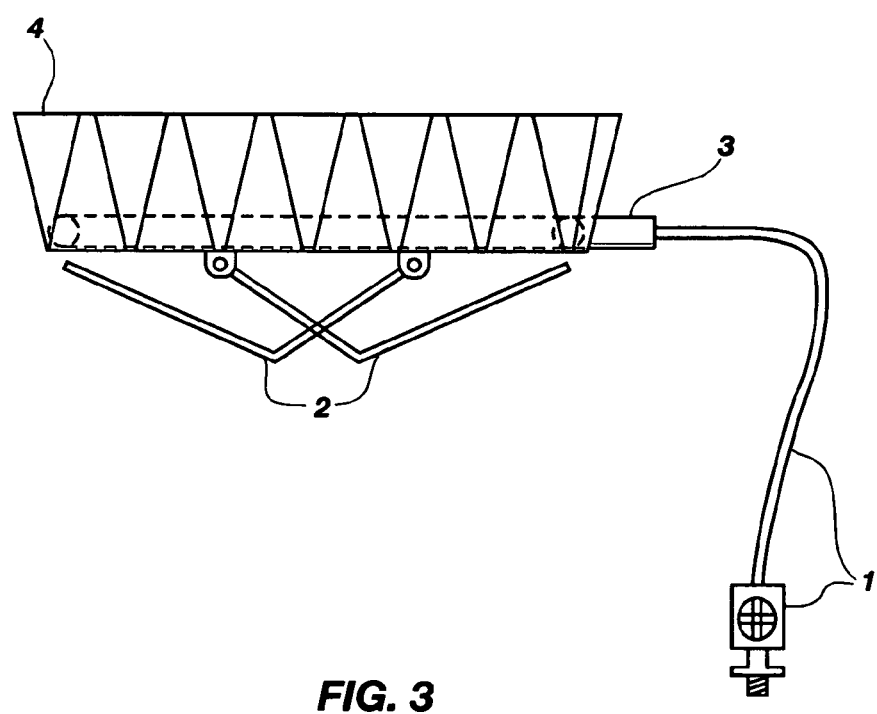
FIG. 3: is a side view of the present invention with the folding legs in the retracted position for storage.

Item 2) is the folding legs, consisting of 2 each ³⁄₁₆ inch galvanized steel rods 36 inches long and bent to form the winged shape with the flat stops shown in FIGS. 1, 2, and 3. They are adjusted to clip, with self provided spring tension into the ³⁄₁₆ inch holes located in the bent ears on the bottom of the windscreen base (Item 4).

Figure 4:
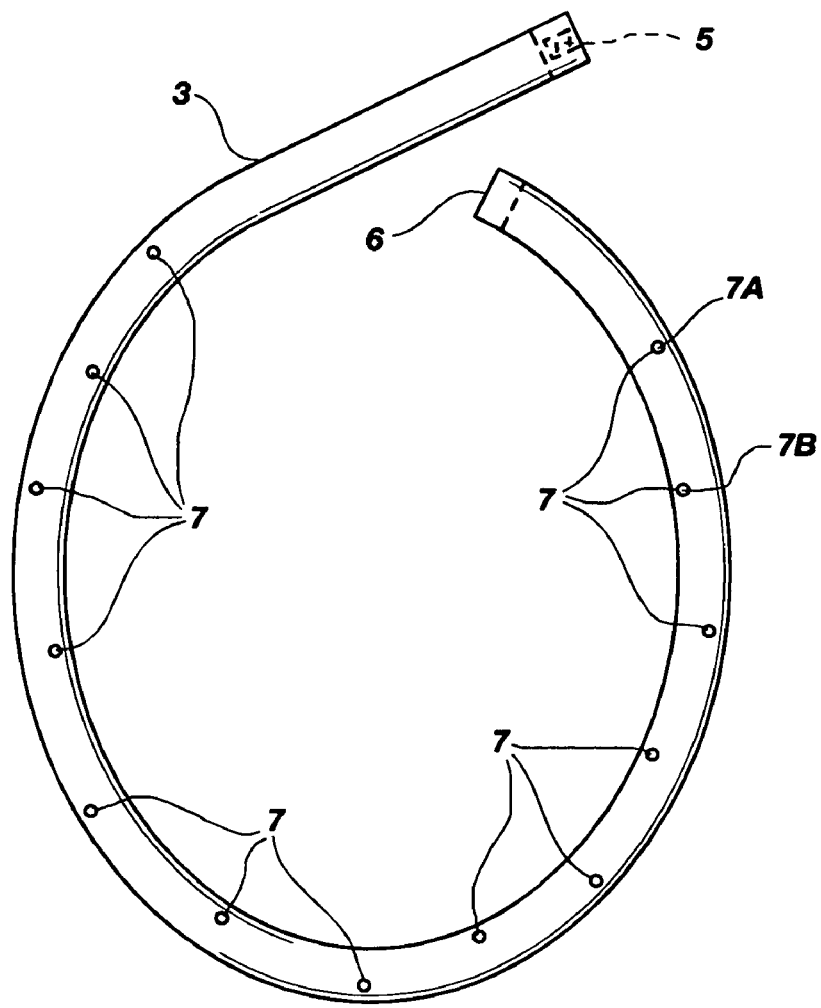
FIG. 4: is a top view of the first burner, that produces the realistic wood fire replacement fireball, showing the hole location and pattern.
Figure 5:
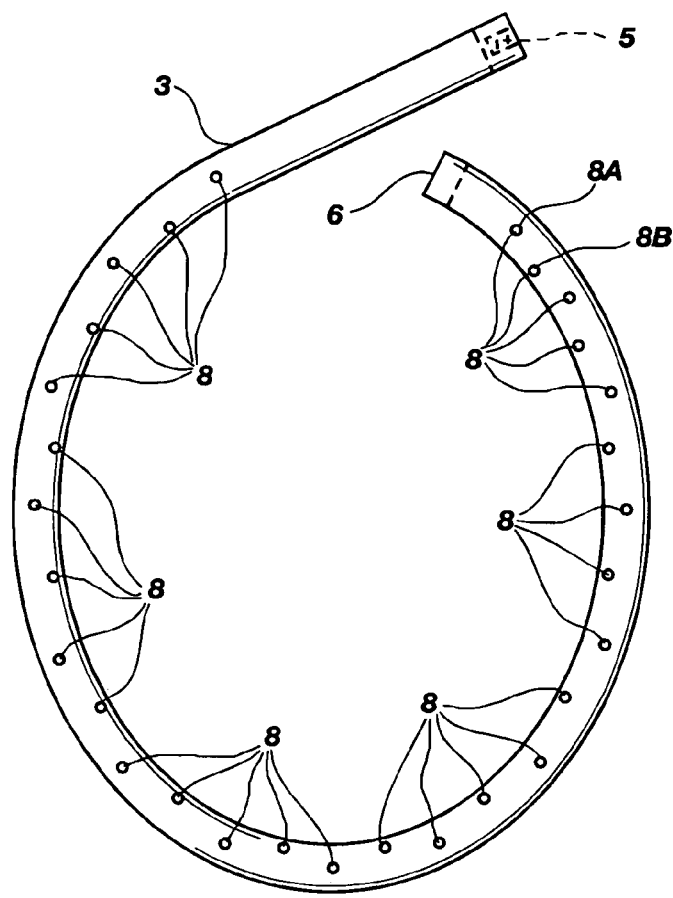
FIG. 5: is a top view of the second burner, that produces the uniform non-flickering fireball for heat and cooking, showing the hole location and pattern.

Item 3) is the burner which consists of a ¾ inch thin wall galvanized steel tube, bent into a 12 inch diameter circle. There is a brass plug (Item 6 FIG. 4, and 5) cut oversize and pressure fit into the end of the tube then crimped. The input end has a brass plug (Item 5 FIG. 4, and 5) that is pressure fit into the input end and crimped, this plug has a through hole that is threaded to mate a connector to the ⅜ inch swivel fitting on the flexible hose. The usage will determine which hole pattern is needed. The burners are interchangeable. The hole patterns are shown in FIG. 4, and 5, and are drilled into the tube. FIG. 4 shows the first burner that has 13 (item 7 FIG. 4) ⅛-inch holes drilled in the illustrated pattern this produces a yellow orange fireball with long dancing fire fingers to produce a fire similar to a normal wood campfire, seven holes 7A are drilled straight up in the top of the tube, the alternating 6 holes 7B are drilled on a 45 degree angle to the inside of the top of the tube. FIG. 5 shows the second burner, which has 29 (item 8 FIG. 5) ¹⁄₁₆-inch holes in the demonstrated pattern this produces a brighter yellow flame that is uniform and steady, it produces a cleaner more uniform heat and light with less flicker. There are 15 holes 8A that are drilled straight up in the top of the tube, the alternating 14 holes 8B are drilled on a 45 degree angle to the inside of the top of the tube. The burner that is being used is set in the windscreen base (Item 4) and the input end of the burner extends through a hole in the side of the windscreen base.

Item 4) is the windscreen base, it consists of a 16 inch diameter circle cut out of ¹⁄₁₆ inch aluminum plate that has the outer 2 inches forged up to form a windscreen. The preferred pattern has the appearance of a large bottle cap. The scalloped, wavy, edges of the windscreen produce a multiplicity of vortices in a wind that protect the individual flames and increase the wind protection. The final appearance can be varied without changing the fit or function of the essential claims of this device. There are five holes in the windscreen, four ³⁄₁₆-inch holes in the bottom that have small ⅝×¾ inch tabs half punched around them that are bent down for receiving the folding legs. The fifth hole is located in the sidewall even with the bottom; it is oblong in shape and sized to pass the burner pipe.

With all the above-described parts assembled as shown in FIG. 1, the input regulator is connected to a propane tank with the hand tight connector. The gas on the tank is turned on and then the regulator is slowly turned up while a lighting devise is held to the first hole on the burner. When it lights, the flame on the first hole should be adjusted to about 2 inches in height. At that time the lighting device should be sequentially moved to the remaining holes to light them all. If this is not done, the fireball will ignite in a dramatic fashion. After the fire is started, use the variable regulator to adjust the campfire to the desired level. After you are finished enjoying the smoke free, safe fire, turn the tank valve off and then close the regulator. Let the device cool approximately 10 minutes before handling. At that point the device can be unscrewed from the gas supply and the legs can be folded up and the device can stored with no other cleanup needed.

I claim:

1. A portable campfire device comprising:
    a transporter for transporting fuel from a fuel source for providing a fuel for a flame;
    a burner comprising a conduit having a plurality of openings for releasing said fuel; and
    a windscreen body supporting said burner, said windscreen body comprising a plate portion and an upward extending edge, said upward extending edge defining an exterior surface, and an interior surface defining a chamber for receiving said burner, said upward extending edge having a non-corrugated circular configuration adjoining said plate portion and a plurality of waves formed in an upper terminal free end of said upward extending edge, said plurality of waves increasing in amplitude from said plate portion to said upper terminal free end, said plurality of waves being configured for producing a plurality of vortices in wind for protecting said flame, wherein said plurality of waves are spaced apart to prevent said interior surface of said upward extending edge from contacting itself.

2. The device of claim 1, wherein a hole is formed in a side of said windscreen body for receiving said burner therethrough.

3. The device of claim 1, further comprising a plurality of legs for supporting said windscreen body on a surface, each of said plurality of legs comprising a single piece member having a first end pivotally connected to said windscreen body and a second end for contacting said surface.

4. The device of claim 3, wherein said windscreen body further comprises a plurality of tabs for receiving said plurality of legs.

5. The device of claim 1, wherein said windscreen body is formed of aluminum and wherein said device is characterized by an absence of structural features for absorbing heat above said burner such that said campfire device is configured to cool rapidly when said flame is extinguished.

6. The device of claim 1, wherein said plurality of openings are arranged in an alternating configuration such that every other opening extends from an upper portion of said burner, and intermediate openings extend from a lateral portion of said burner.

7. A portable campfire device comprising:
   a transporter for transporting fuel from a fuel source for providing a fuel for a flame;
   a burner comprising a conduit having a plurality of openings for releasing said fuel;
   a windscreen body supporting said burner, said windscreen body configured for protecting said flame from wind; and
   a plurality of legs for supporting said windscreen body on a surface, each of said plurality of legs comprising a single piece member having a first end pivotally connected to said windscreen body and a second end for contacting said surface, each of said plurality of legs further comprising a first portion proximal said first end, said first portion forming a stop for contacting said windscreen body to limit rotation of said leg, wherein each of said plurality of legs further comprises a second portion proximal said second end, wherein said first portion is arranged in a non-straight relationship with said second portion, and wherein said plurality of legs are movable between an extended position for supporting said windscreen body on said surface, and a folded position for occupying reduced space for storage;
   wherein said plurality of legs comprises two legs;
   wherein said first portion of each of said plurality of legs is configured to define a first plane, and wherein said second portion of said plurality of legs is configured to define a second plane different from said first plane;
   wherein said second portion extends angularly from said first portion;
   wherein said plurality of openings are arranged in an alternating configuration such that every other opening extends from an upper portion of said burner, and intermediate openings extend from a lateral portion of said burner;
   wherein said conduit forming said burner has a substantially circular cross-sectional shape;
   wherein said burner is formed in an annular shape;
   wherein said windscreen body comprises a plate portion and an upward extending edge, said upward extending edge defining an exterior surface, and an interior surface defining a chamber for receiving said burner, said upward extending edge having a non-corrugated circular configuration adjoining said plate portion and a plurality of waves formed in an upper terminal free end of said upward extending edge, said plurality of waves increasing in amplitude from said plate portion to said upper terminal free end, said plurality of waves being configured for producing a plurality of vortices in wind for protecting said flame, wherein said plurality of waves are spaced apart to prevent said interior surface of said upward extending edge from contacting itself;
   wherein a hole is formed in a side of said windscreen body for receiving said burner therethrough;
   wherein said windscreen body further comprises a plurality of tabs for receiving said plurality of legs;
   wherein said windscreen body is formed of aluminum and wherein said device is characterized by an absence of structural features for absorbing heat above said burner such that said device is configured to cool rapidly when said flame is extinguished;
   wherein said intermediate openings extend at an angle of substantially 45 degrees to an interior of a top of said conduit;
   wherein said burner is interchangeable with another burner having a plurality of openings in a different configuration;
   wherein said burner comprises a different number of openings than said other burner;
   wherein said burner comprises said plurality of openings having a different size than said plurality of openings in said different configuration;
   wherein said burner is positioned above said plate portion of said windscreen body;
   wherein said transporter comprises a regulator and a hose for transporting fuel to said burner.

* * * * *